(12) United States Patent
Derginer et al.

(10) Patent No.: US 12,124,277 B1
(45) Date of Patent: *Oct. 22, 2024

(54) METHOD AND SYSTEM FOR CONTROLLING ATTITUDE OF A MARINE VESSEL

(71) Applicant: Brunswick Corporation, Mettawa, IL (US)

(72) Inventors: Matthew E. Derginer, Butte des Mort, WI (US); David W. Dochterman, Panama City, FL (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,755

(22) Filed: Apr. 28, 2023

Related U.S. Application Data (63) Continuation of application No. 16/536,013, filed on Aug. 8, 2019, now Pat. No. 11,675,372.

(51) Int. Cl.
| | |
|---|---|
| *G05D 1/08* | (2006.01) |
| *B63B 39/00* | (2006.01) |
| *B63H 25/42* | (2006.01) |
| *G05D 1/00* | (2006.01) |

(52) U.S. Cl.
CPC ........... *G05D 1/0875* (2013.01); *B63B 39/00* (2013.01); *B63H 25/42* (2013.01)

(58) Field of Classification Search
CPC ........ G05D 1/08; G05D 1/0875; B63B 39/00; B63H 25/00; B63H 25/42; G01C 21/00
USPC .......................................................... 701/21
See application file for complete search history.

(56) References Cited

U.S. PATENT DOCUMENTS

| | | |
|---|---|---|
| 2,979,010 A | 4/1961 | Braddon et al. |
| 4,380,206 A | 4/1983 | Baitis et al. |
| 6,234,853 B1 | 5/2001 | Lanyi et al. |
| 6,273,771 B1 | 8/2001 | Buckley et al. |
| 7,267,068 B2 | 9/2007 | Bradley et al. |
| 8,417,399 B2 | 4/2013 | Arbuckle et al. |
| 9,183,711 B2 | 11/2015 | Fiorini et al. |
| 9,355,463 B1 | 5/2016 | Arambel et al. |
| 9,615,006 B2 | 4/2017 | Terre et al. |

(Continued)

FOREIGN PATENT DOCUMENTS

| | | |
|---|---|---|
| CA | 2279165 | 1/2001 |
| CA | 2282064 | 1/2001 |

(Continued)

OTHER PUBLICATIONS

EP20187884.0, European Search Report dated Mar. 31, 2021.

*Primary Examiner* — Lars A Olson
(74) *Attorney, Agent, or Firm* — Andrus Intellectual Property Law, LLP (57) ABSTRACT

A method of controlling attitude of a marine vessel includes measuring a roll motion of the marine vessel with an attitude sensor, and then determining that the roll motion exceeds a threshold roll where no corresponding steering input is present. The method further includes determining a counteracting drive movement for at least one propulsion device based on the measured roll motion and then controlling a steering actuator to move the at least one propulsion device to effectuate the counteracting drive movement so as to counteract an environmentally-induced roll motion of the marine vessel without effectuating a net change in heading and/or translation.

22 Claims, 9 Drawing Sheets

(56) References Cited

U.S. PATENT DOCUMENTS

| | | |
|---|---|---|
| 9,729,802 B2 | 8/2017 | Frank et al. |
| 9,734,583 B2 | 8/2017 | Walker et al. |
| 9,996,083 B2 | 1/2018 | Vojak |
| 10,054,956 B1 | 8/2018 | Anschuetz et al. |
| 10,055,648 B1 | 8/2018 | Grigsby et al. |
| 10,106,238 B2 | 10/2018 | Sidki et al. |
| 10,191,153 B2 | 1/2019 | Gatland |
| 10,431,099 B2 | 1/2019 | Stewart et al. |
| 10,281,917 B2 | 5/2019 | Tyers |
| 10,338,800 B2 | 7/2019 | Rivers et al. |
| 10,444,349 B2 | 10/2019 | Gatland |
| 2010/0030411 A1 | 2/2010 | Wilson et al. |
| 2016/0214534 A1 | 7/2016 | Richards et al. |
| 2018/0259338 A1 | 9/2018 | Stokes et al. |
| 2018/0259339 A1 | 9/2018 | Johnson et al. |
| 2019/0251356 A1 | 8/2019 | Rivers |
| 2019/0258258 A1 | 8/2019 | Tyers |

FOREIGN PATENT DOCUMENTS

| | | |
|---|---|---|
| WO | 2017167905 | 10/2017 |
| WO | 2018162933 | 9/2018 |
| WO | 2018183777 | 10/2018 |
| WO | 2018201097 | 11/2018 |
| WO | 2018232376 | 12/2018 |
| WO | 2019096401 | 5/2019 |
| WO | 2019126755 | 6/2019 |
| WO | 2019157400 | 8/2019 |
| WO | 2019201945 | 10/2019 |

METHOD AND SYSTEM FOR CONTROLLING ATTITUDE OF A MARINE VESSEL

CROSS-REFERENCE TO RELATED APPLICATION

The present application is a continuation of U.S. patent application Ser. No. 16/536,013, filed Aug. 8, 2019, the content of which is incorporated herein in its entirety.

FIELD

The present disclosure generally relates to systems and methods for controlling propulsion of a marine vessel in a body of water, and more specifically to propulsion control systems configured to control attitude of a marine vessel.

BACKGROUND

The following U.S. Patents and Applications provide background information and are each incorporated herein by reference in their entireties.

U.S. Pat. No. 6,234,853 discloses a docking system that utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 8,417,399 discloses systems and methods for orienting a marine vessel minimize at least one of pitch and roll in a station keeping mode. A control device having a memory and a programmable circuit is programmed to control operation of the plurality of marine propulsion devices to maintain orientation of a marine vessel in a selected global position and heading. The control device receives at least one of actual pitch and actual roll of the marine vessel in the global position and controls operation of the plurality of marine propulsion units to change the heading of the marine vessel to minimize at least one of the actual pitch and the actual roll while maintaining the marine vessel in the selected global position.

U.S. Pat. No. 10,054,956 discloses a method of controlling a marine propulsion system includes receiving a roll position measurement signal from a roll sensor measuring roll position of a marine vessel and receiving a steering input. The method includes determining based on the roll position measurement signal and the steering input that the roll position of the marine vessel exceeds a port threshold in a port roll direction where no corresponding steering input is present, and determining based on the roll position measurement signal and the steering input that the roll position of the marine vessel exceeds a starboard threshold in a starboard roll direction where no corresponding steering input is present. A steering compensation is then determined based on the roll position measurement signal, and an actuator is controlled to effectuate the steering compensation to reduce a magnitude of the roll position of the marine vessel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method of controlling attitude of a marine vessel includes identifying a natural roll frequency of the marine vessel, measuring a roll motion of the marine vessel with an attitude sensor, and then determining that the roll motion exceeds the threshold roll where no corresponding steering input is present. The method further includes determining a counteracting drive movement for at least one propulsion device based on the measured roll motion and the natural roll frequency of the marine vessel. A steering actuator is then controlled to move the at least one propulsion device to effectuate the counteracting drive movement so as to counteract an environmentally-induced roll motion of the marine vessel.

One embodiment of a system for controlling attitude of a marine vessel includes a plurality of propulsion devices connected to a transom of the marine vessel. For each of the plurality of propulsion devices, a steering actuator is configured to rotate that propulsion device about a vertical axis. A vessel attitude sensor is configured to measure a roll motion of the marine vessel. A controller is configured to receive a roll motion measurement of the marine vessel from the attitude sensor and then determine whether the roll motion measurement exceeds a threshold roll where no corresponding steering input is present. If so, a counteracting drive movement is determined for at least one of the plurality of propulsion devices based on the roll motion measurement and a natural roll frequency of the marine vessel. A steering actuator is then controlled for the at least one of the plurality of propulsion devices to effectuate the counteracting drive movement such that the roll motion of the marine vessel is counteracted.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Stabilization devices to reduce environmentally-induced disturbances are becoming common on yachts and larger vessels. For example, vessel roll induced by waves hitting the vessel operating at low vessel speeds or is stationary are undesirable and uncomfortable for people on the vessel. Stabilization devices, such as gyroscope stabilizers and fin stabilizers are implemented, particularly on large vessels, to counteract these unwanted disturbances. However, these devices are large, costly, consume significant amounts of power to operate, and add to the maintenance requirements of the marine vessel. Thus, stabilizers are generally not used on smaller vessels, largely due to their substantial size, power consumption, and cost.

Smaller marine vessels generally do not contain any stabilization devices to counteract environmentally-induced disturbances in roll or pitch. These disturbances, especially roll, can be annoying and disruptive for boaters. When a roll of at least a threshold magnitude is induced in the marine vessel, the marine vessel will often oscillate back and forth for an extended period of time. Marine vessels each have a natural roll frequency at which the oscillations typically occur, which is the frequency at which the marine vessel naturally rolls about its center of gravity or center of rotation. Vessels also typically have a natural pitch frequency, which is the frequency at which the marine vessel naturally rotates in the forward and aft direction about its center of gravity. This roll or pitch frequency is induced when an environmental disturbance, such as wind or waves, causes a threshold change in attitude, such as a threshold change in roll and/or a threshold change in pitch.

In view of the foregoing problems and issues in the relevant field, the inventors have recognized a need for a stabilization system that can be implemented on smaller vessels and, particularly, a stabilization solution that does not require any additional or specialized hardware. Through their extensive experimentation and research in the relevant field, the inventors have recognized that propulsion devices can be utilized to counteract roll and/or pitch motion of the marine vessel, and thus can act as stabilizers. In particular, the inventors have recognized that roll can be induced in a vessel without causing significant lateral, or translational, movement by moving the propulsion devices in such a way to target the natural roll frequency of the marine vessel. The inventors have recognized that roll can be induced using drive movement alone, especially outboard propulsion devices, without introducing any thrust. Outboard motors tend to be large and heavy devices mounted behind the stern of the vessel, and the inventors have realized that moving these devices back and forth about their steering axes at a particular frequency can target the natural roll frequency of the marine vessel.

Based on such recognition, the inventors have further discovered that propulsion devices can be moved opposite the natural roll frequency of a marine vessel in order to eliminate, or counteract, the vessel roll. Namely, the inventors have developed the disclosed system whereby the propulsion devices are used to induce a roll opposite to a roll caused by waves or other disturbances. In certain embodiments, engine thrust can be used in addition to the drive movement in order to counteract the environmentally-induced roll and/or pitch, such as by applying alternating thrust for short periods. The alternating thrust and/or drive movements are applied in such a way so as not to cause a net change to the position or the current thrust vector of the vessel. The inventors have recognized that such a vessel stabilization routine may be particularly useful when the marine vessel is at idle or traveling at low speed, and thus is particularly vulnerable to environmentally-induced roll motions. For example, such a method can be used to counteract roll, and thus stabilize the vessel, during station keeping mode, and performed such that the drive motion and/or thrust do not substantially impact the position of the marine vessel.

Figure 1:
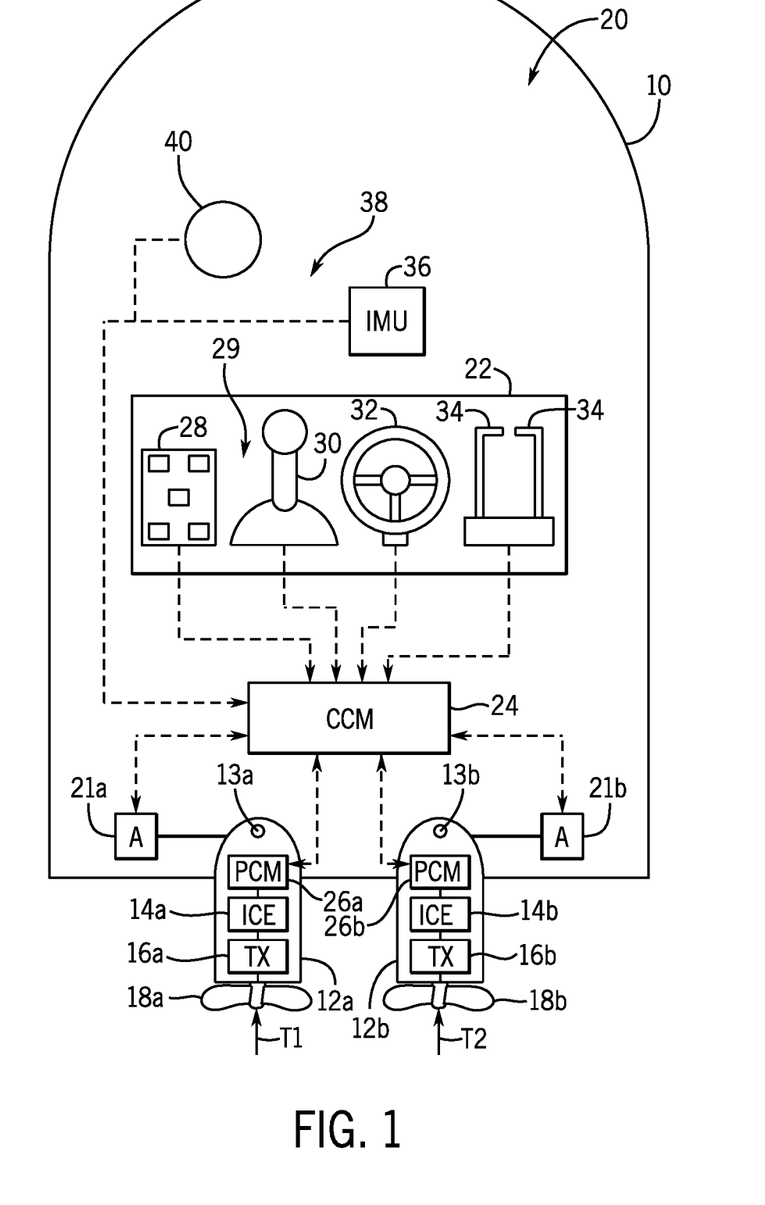
FIG. 1 provides a schematic representation of the marine propulsion system on a marine vessel in accordance with one embodiment of the present disclosure.

FIG. 1 shows a marine vessel 10 equipped with a propulsion system 20 configured according to one embodiment of the disclosure. The marine vessel 10 is capable of operating, for example, in a joysticking mode, among other modes, as described hereinbelow. The vessel 10 has first and second propulsion devices 12a, 12b that produce first and second thrusts T1, T2 to propel the vessel 10, as will be more fully described hereinbelow. As illustrated, the first and second propulsion devices 12a, 12b are outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also includes various control elements that comprise part of the marine propulsion system 20. The marine propulsion system 20 comprises an operation console 22 in signal communication, for example via a CAN bus as described in U.S. Pat. No. 6,273,771, with a controller 24, such as for example a command control module (CCM), and with propulsion control modules (PCM) 26a. 26b associated with the respective propulsion devices 12a, 12b. Each of the controller 24 and the PCMs 26a, 26b may include a memory and a programmable processor. As is conventional, the processor is communicatively connected to the memory comprising a computer-readable medium that includes volatile or nonvolatile memory upon which computer-readable code is stored. The processor can access the computer-readable code and upon executing the code carries out functions as described hereinbelow.

In other examples of the marine propulsion system 20, only one control module is provided for the system rather than having a CCM and separate PCMs. In other examples, one CCM is provided for each propulsion device, and/or additional control modules are provided for controlling engine speed and functions separately from steering and trim of the propulsion devices. For example, the PCMs 26a, 26b may control the engines 14a, 14b and transmissions 16a, 16b of the propulsion devices 12a, 12b, while additional thrust vector modules (TVMs) may control their orientation. In other examples of the marine propulsion system 20, the vessel control elements are connected via wireless communication rather than by a serially wired CAN bus. It should be noted that the dashed lines shown in FIG. 1 are meant to show only that the various control elements are capable of communicating with one another, and do not represent actual wiring connecting the control elements, nor do they represent the only paths of communication between the elements.

The operation console 22 includes a number of user input devices, such as a keypad 28, a joystick 30, a steering wheel 32, and one or more throttle/shift levers 34. Each of these devices inputs commands to the controller 24. The controller 24, in turn, communicates with the first and second propulsion devices 12a, 12b by communicating with the PCMs 26a, 26b. The controller 24 also receives information from an attitude sensor 36 (e.g., pitch and roll), such as an inertial measurement unit (IMU). The IMU 36 may comprise a portion of a global positioning system (GPS) 38 which, in the example shown, also comprises a GPS receiver 40 located at a pre-selected fixed position on the vessel 10, which provides information related to the global position of the vessel 10. In one example, the IMU 36 is an inertial navigation system (INS) consists of a MEMS gyroscope, or a MEMS angular rate sensor, a MEMS accelerometer, and a magnetometer, which are used together to calculate velocity and heading of the marine vessel relative to magnetic north. In other embodiments, the motion and angular position (including pitch and roll) may be sensed by a different attitude sensor or sensing system, such as an attitude heading reference system (AHRS) that provides 3D orientation of the marine vessel 10 by integrating gyroscopic measurements, accelerometer data, and magnetometer data. Signals from the GPS receiver 40 and/or the IMU (or INS) 36 are provided to the controller 24.

The steering wheel 32 and the throttle/shift levers 34 function in a conventional manner, such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively.

A manually operable input device, such as the joystick 30, can also be used to provide signals to the controller 24. The joystick 30 can be used to allow the operator of the vessel 10 to manually maneuver the vessel 10, such as to achieve translation or rotation of the vessel 10, as will be described below. It should be understood that in alternative examples, the various components 28, 30, 32, 34 may communicate directly with the PCMs 26a, 26b or may communicate with one or more central control modules.

The system 20 includes at least one steering actuator 21 configured to move the propulsion device, such as to change a heading of the marine vessel. The depicted embodiment includes a first steering actuator 21a configured to rotate the propulsion device 12a about the vertical axis 13a and a second steering actuator 21b configured to rotate the second propulsion device 12b about the respective vertical axis 13b. As will be understood by a person having ordinary skill in the art, the system 20 depicted in FIG. 1 incorporates a "steer-by-wire" steering arrangement whereby each input device, such as joystick 30 and steering wheel 32, are associated with sensors that electronically communicate operator steering inputs. The controller 24 receives the inputs and provides corresponding control commands to the steering actuators 21a and 21b. Various other control arrangements may be utilized for effectuating steer-by-wire systems, which are within the scope of the present disclosure. In various embodiments, the steering actuators 21a and 21b may include a hydraulic motor, and an electric motor, an electric over hydraulic system, or the like. Each actuator 21a, 21b responds to signals received from the controller 24 and effectuate a desired drive motion and/or steering position based on the control commands, as is standard for steer-by-wire systems.

Figure 2:
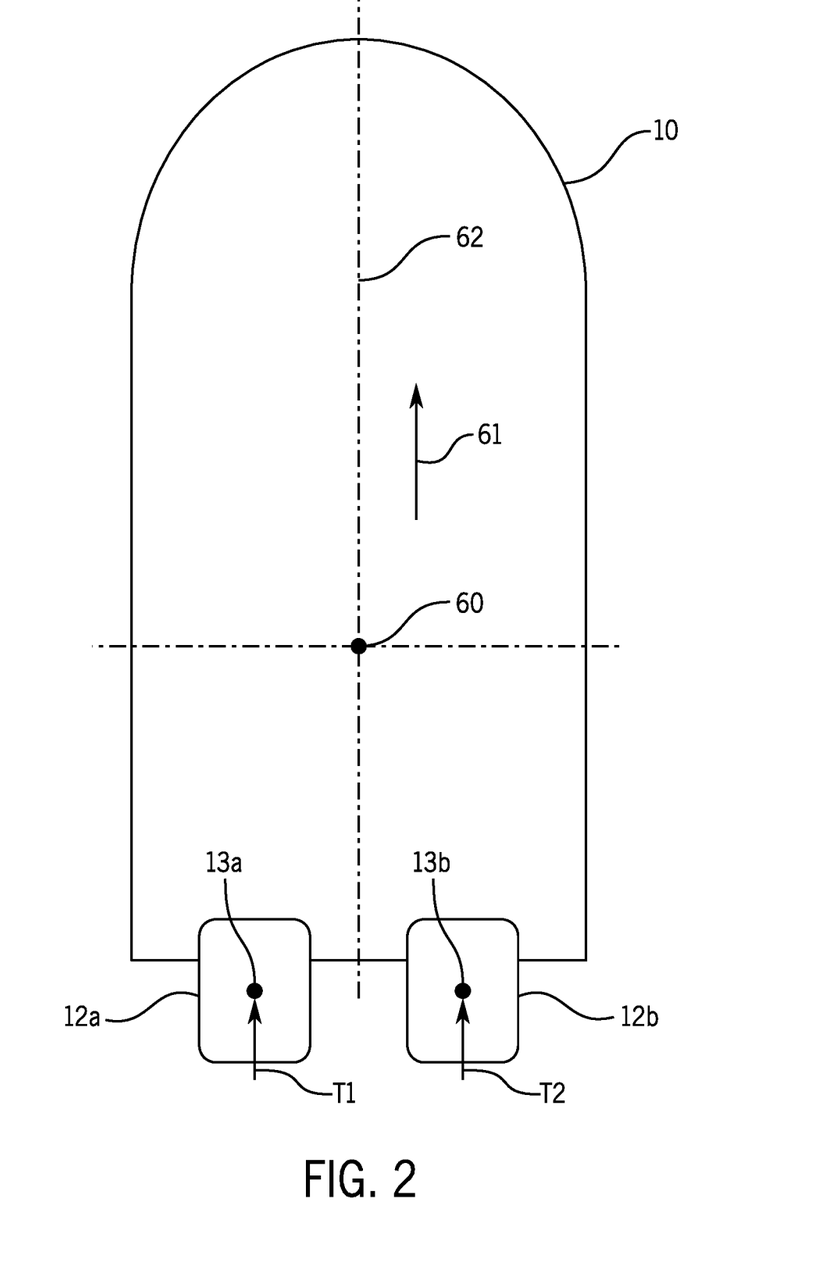
FIG. 2 illustrates an arrangement of thrust vectors during forward movement of the marine vessel.

In FIG. 2, the vessel 10 is illustrated schematically with its center of rotation (COR) 60, which can be a calibrated preselected point on the vessel 10. In other examples, point 60 could instead be an instantaneous center of gravity. The COR 60 is a function of several factors which comprise the speed of the vessel 10 as it moves through the water, the hydrodynamic forces on the hull of the vessel 10, the weight distribution of the load contained within the vessel 10, and the degree to which the vessel 10 is disposed below the waterline. The location of the COR 60 can be empirically determined for various sets of conditions. For purposes of the below explanation, the point 60 will be referred to as the COR, although it will be understood by a person of ordinary skill that similar calculations can be carried out using the center of gravity.

First and second vertical steering axes 13a and 13b are illustrated for the first and second propulsion devices 12a, 12b. The first and second propulsion devices 12a, 12b are rotatable about the first and second vertical steering axes 13a and 13b, respectively. The ranges of rotation of the first and second propulsion devices 12a, 12b may be symmetrical with respect to a centerline 62 of the vessel 10. The positioning method of the present disclosure rotates the first and second propulsion devices 12a, 12b about their respective steering axes 13a, 13b, adjusts their operation in forward or reverse gear, and adjusts the magnitude of their thrusts T1, T2 (for example, by adjusting engine speed and/or propeller pitch or transmission slip) in an efficient manner that allows rapid and accurate maneuvering of the vessel 10. The rotation, gear, and thrust magnitude of one propulsion device 12a can be varied independently of the rotation, gear, and thrust magnitude of the other propulsion device 12b.

FIG. 2 illustrates a thrust orientation that is used when it is desired to move the vessel 10 in a forward direction represented by arrow 61, with no movement in either a right or left direction and no rotation about its COR 60. This is done by rotating the first and second propulsion devices 12a, 12b into an aligned position, in which their thrust vectors T1 and T2 are parallel to one another. As can be seen in FIG. 2, the first and second thrust vectors, T1 and T2, are equal in magnitude and are directed in the same forward direction. This creates no resultant rotation about the COR 60 and no resultant movement in either the left or right directions. Movement in the direction represented by arrow 61 results from all of the vector components (described further hereinbelow) of the first and second thrust vectors T1, T2 being resolved in a direction parallel to arrow 61. The resultant thrust components parallel to arrow 61 are additive and together provide net forward thrust in the direction of arrow 61 to the vessel 10.

Figure 3:
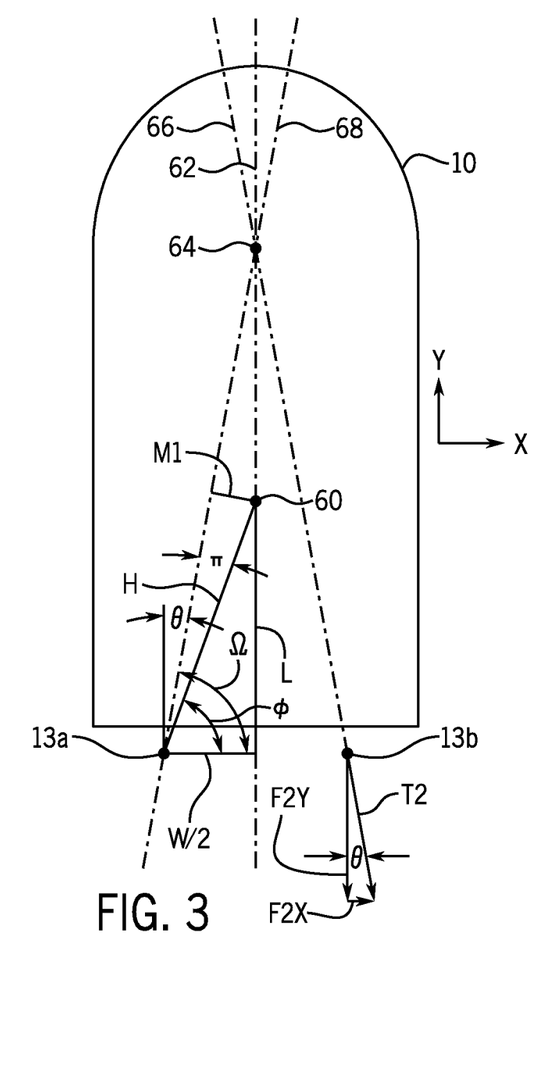
FIGS. 3 and 4 illustrate exemplary arrangements of thrust vectors used to rotate the marine vessel about its center of rotation.
Figure 4:
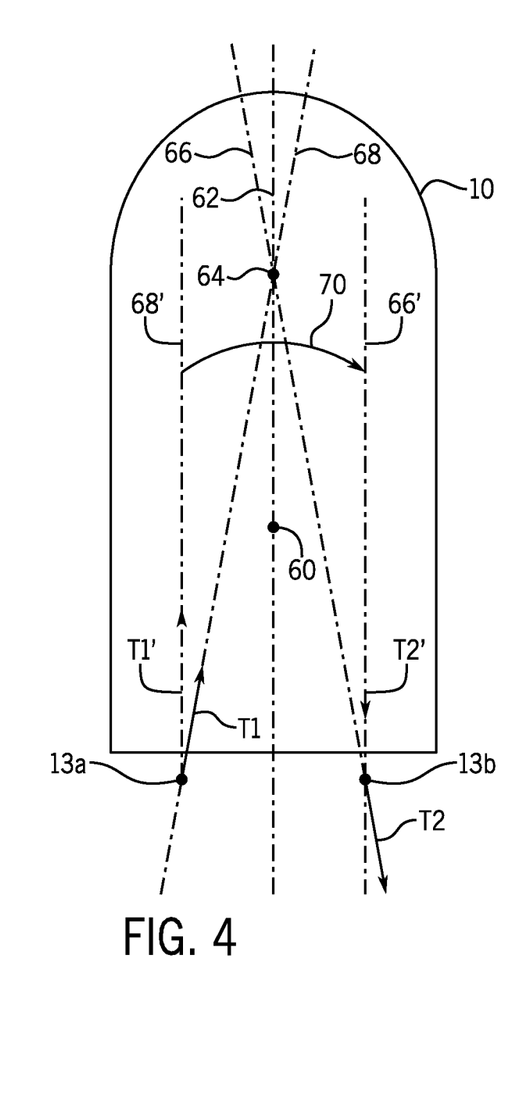

As illustrated in FIGS. 3 and 4, when a rotation of the vessel 10 is desired in combination with linear translation movement, the first and second propulsion devices 12a, 12b are rotated about the respective first and second steering axes 13a, 13b to steering angles θ with respect to the centerline 62 so that their thrust vectors intersect at a point on the centerline 62. Although thrust vector T1 is not shown in FIG. 3 for purposes of clarity (see FIG. 4 for its magnitude and direction), its associated line of action 68 is shown intersecting with a line of action 66 of thrust vector T2 at a point 64. Because the point 64 is not coincident with the COR 60, an effective moment arm M1 exists with respect to the thrust T1 produced by the first propulsion device 12a. The moment about the COR 60 is equivalent to the magnitude of the thrust vector T1 multiplied by dimension M1. Moment arm M1 is perpendicular to dashed line 68 along which the first thrust vector T1 is aligned. As such, it is one side of a right triangle which also comprises a hypotenuse H. It should also be understood that another right triangle in FIG. 3 comprises sides L, W/2, and the hypotenuse H. So long as the propulsion devices 12a, 12b are rotated about their respective steering axes 13a, 13b by the same angle θ, a moment arm M2 (not shown for purposes of clarity) of equal magnitude to moment arm M1 would exist with respect to the second thrust vector T2 directed along line 66.

With continued reference to FIG. 3, those skilled in the art will recognize that the length of the moment arm M1 can be determined as a function of steering angle θ; angle @; angle x; the distance between the first and second steering axes 13a and 13b (equal to W in FIG. 3); and the perpendicular distance L between the COR 60 and a line extending between the first and second steering axes 13a, 13b. The length of the line extending between the first steering axis 13a and the COR 60 is the hypotenuse H of a right triangle and can easily be determined using the Pythagorean theorem given L and W, which are known and saved in the control module's memory. The magnitude of θ is calculated as described hereinbelow with respect to equations 1-4. The magnitude of angle Ω is 90−θ. The magnitude of angle Φ is equivalent to the arctangent of the ratio of length L to the distance between the first steering axis 13a and the vessel's centerline 62, which is identified as W/2. The length of the moment arm M1 can be mathematically determined by controller 24 using the length of line H and the magnitude of angle π (which is Ω−Φ).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 3 shows the vector components of the second thrust vector T2. As illustrated, second thrust vector T2 is oriented along line 66, which is at steering angle θ with respect to the centerline 62. The second thrust vector T2 can be resolved into components, parallel and perpendicular to centerline 62, that are calculated as functions of the steering angle θ. For example, the second thrust vector T2 can be resolved into a reverse-directed force F2Y and a side-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the marine propulsion system 20 can be calculated by adding the respective forward/reverse and left/right vector components of T1 and T2:

$$FX = T1(\sin(\theta)) + T2(\sin(\theta)) \qquad (1)$$

$$FY = T1(\cos(\theta)) - T2(\cos(\theta)) \qquad (2)$$

Note that in the example of FIGS. 3 and 4, T1 has positive vector components in both the X and Y directions, while T2 has a positive vector component in the X direction and a negative vector component in the Y direction, which is therefore subtracted from the Y-directed vector component of T1. The net thrust acting on the vessel 10 can be determined by vector addition of FX and FY.

Turning to FIG. 4, a moment (represented by arrow 70) can also be imposed on the vessel 10 to cause it to rotate about its COR 60—i.e., to effectuate yaw velocity. The moment 70 can be imposed in either rotational direction: clockwise (CW) or counterclockwise (CCW). The rotating force resulting from the moment 70 can be applied either in combination with a linear force on the vessel 10 or alone. In order to combine the moment 70 with a linear force, the first and second thrust vectors T1, T2 are aligned in generally opposite directions with their respective lines of action 68, 66 intersecting at the point 64 illustrated in FIG. 4. Although the construction lines are not shown in FIG. 4, effective moment arms M1, M2 exist with respect to the first and second thrust vectors T1, T2 and the COR 60. Therefore, a moment is exerted on the vessel 10 as represented by arrow 70. If the thrust vectors T1, T2 are equal to each other in magnitude, are exerted along lines 68 and 66 respectively, and are symmetrical about the centerline 62 and in opposite directions, the net component forces parallel to the centerline 62 are equal to each other and therefore no net linear force is exerted on the vessel 10 in the forward/reverse direction. However, the first and second thrust vectors T1, T2 also resolve into forces perpendicular to the centerline 62, which in this example are additive. As a result, the marine vessel 10 in FIG. 4 will move to the right as it rotates in a clockwise direction in response to the moment 70.

If, on the other hand, it is desired that the moment 70 be the only force on the vessel 10, with no lateral translation, or movement, in the forward/reverse or left/right directions, alternative first and second thrust vectors, represented by T1' and T2' in FIG. 4 are aligned parallel to each other along dashed lines 68' and 66', which are parallel to the centerline 62. The first and second thrust vectors T1', T2' are of equal magnitude and opposite direction. As a result, no net force is exerted on the vessel 10 in a forward/reverse direction. Because angle θ for both thrust vectors T1' and T2' is equal to 0 degrees, no resultant force is exerted on the vessel 10 in a direction perpendicular to the centerline 62. As a result, a rotation of the vessel 10 about its COR 60 is achieved with no linear movement in either the forward/reverse or the left/right directions.

With reference to FIGS. 2-4, it can be seen that movement and operation of the propulsion devices 12a and 12b can be controlled to effectuate virtually any type of desired movement of the vessel 10 within three degrees of freedom—i.e., surge, sway, and yaw. If forward translation with no rotation is requested (e.g. via operator input, from an autonomous navigation controller, etc.), the first and second propulsion devices 12a, 12b are oriented so that their thrust vectors align in a forward parallel orientation, as shown in FIG. 2, and so long as the magnitude and direction of T1 are equal to that of T2, the vessel 10 will travel in a forward direction. If, on the other hand, the steering input signal requests a rotation about the COR 60, the first and second thrust vectors T1, T2 are directed along lines 68 and 66 that do not intersect at the COR 60, but instead intersect at another point 64 along the centerline 62. As shown in FIGS. 3 and 4, this intersection point 64 can be forward from the COR 60. The thrusts T1 and T2 shown in FIG. 4 result in a clockwise rotation (shown by moment 70) of the vessel 10. Alternatively, if the first and second propulsion devices 12a, 12b are rotated so that they intersect at a point along the centerline 62 that is behind the COR 60, an opposite effect could be realized, all else being equal. It should also be recognized that, with an intersection point 64 forward of the COR 60, the directions of the first and second thrust vectors T1, T2 could be reversed to cause a rotation of the vessel 10 in a counterclockwise direction.

It should be noted that the angles and movements of the propulsion devices 12a, 12b need not be the same. For example, the first propulsion device 12a can be steered to angle $\theta_1$ with respect to the centerline 62, while the second propulsion device 12b can be moved to angle $\theta_2$. Also note that the propulsion devices 12a and 12b may be moved at different rates, or rotational velocities about their respective vertical steering axes 13a and 13b. The controller 24 will determine the net thrust and the net moment desired of the marine propulsion system 20. It can be seen, therefore, that T1, T2, $\theta_1$, and $\theta_2$ can thereafter be calculated by the controller 24 using the geometric relationships described hereinabove according to the following equations:

$$FX = T1(\sin(\theta_1)) + T2(\sin(\theta_2)) \quad (1)$$

$$FY = T1(\cos(\theta_1)) - T2(\cos(\theta_2)) \quad (2)$$

$$MCW = (W/2)(T1(\cos(\theta_1))) + (W/2)(T2(\cos(\theta_2))) \quad (3)$$

$$MCCW = L(T1(\sin(\theta_1))) + L(T2(\sin(\theta_2))) \quad (4)$$

$$MT = MCW - MCCW \quad (5)$$

where FX and FY are the vector components of the known target linear thrust, MT is the known total target moment (including clockwise moment MCW and counterclockwise moment MCCW) about the preselected point, and L and W/2 are also known as described above. The controller 24 then solves for the four unknowns (T1, T2, $\theta_1$, and $\theta_2$) using the four equations, thereby determining the steering angles, shift positions, and thrust magnitudes of each propulsion device 12a, 12b that will achieve the desired movement of the vessel 10. Note that equations 1-5 are particular to the thrust arrangements shown in FIGS. 3 and 4, and different vector components would contribute to clockwise or counterclockwise rotation and to forward/reverse or right/left translation given thrusts in different directions.

The above principles regarding resolution of the thrust vectors T1, T2 into X components and Y components in order to achieve lateral movement, rotational movement, or a combination of the two are the basis of a maneuvering algorithm of the present method. These algorithms are used to control rotational position, shift position, and thrust magnitude of the propulsion devices 12a, 12b while the vessel 10 operates in various control modes, such as station keeping mode, auto heading mode, waypoint tracking mode, or other automatic propulsion control modes, and also for control during manual steering modes, including joysticking.

As described above, the inventors have recognized that the propulsion devices can be utilized to counteract undesirable roll or pitch motion. In certain embodiments, the movement of the drives back and forth may be sufficient to induce an opposing roll motion of the marine vessel in order to counteract roll motion caused by waves or other disturbances. In other embodiments, the propulsion devices may be controlled in order to produce counteracting thrusts, such as thrust pulses, to counteract roll motion. Thrusts may also be utilized to counteract undesirable vessel pitch motions.

The propulsion devices are maneuvered in a way that targets the natural frequencies of the marine vessel in order to induce a counteracting roll or pitch motion. The natural frequency of the marine vessel may be determined by various means and stored such that it is accessible by the controller 24. As will be known to a person having ordinary skill in the art, the natural roll frequency of the marine vessel and the natural pitch frequency of the marine vessel are a factor of the vessel's hull dynamics and weight configuration. The natural frequency of the marine vessel may be estimated based on the vessel parameters, such as based on the length, width, shape, weight, etc. of the hull. Alternatively or additionally, the natural frequency of a particular marine vessel may be determined by monitoring the behavior of a particular marine vessel. For example, vessel attitude information, such as measured by the IMU 36, may be recorded over time and analyzed in the frequency domain to identify a dominant roll frequency and/or a dominant pitch frequency for the marine vessel from the attitude data.

Figure 6A:
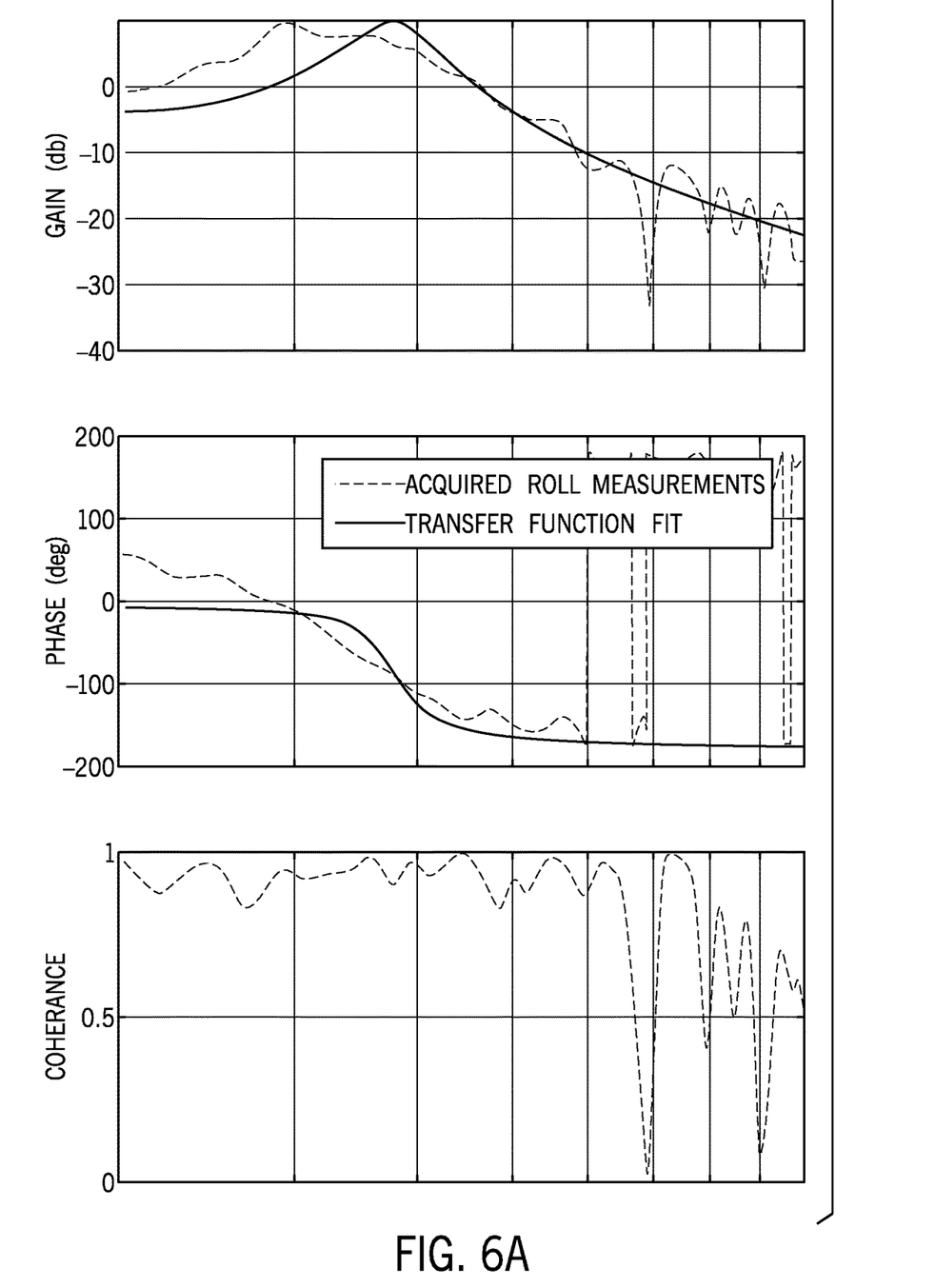
FIGS. 6A and 6B illustrate exemplary roll measurement data depicted in the frequency domain and illustrating a dominant frequency being the marine vessel's natural roll frequency.
Figure 6B:
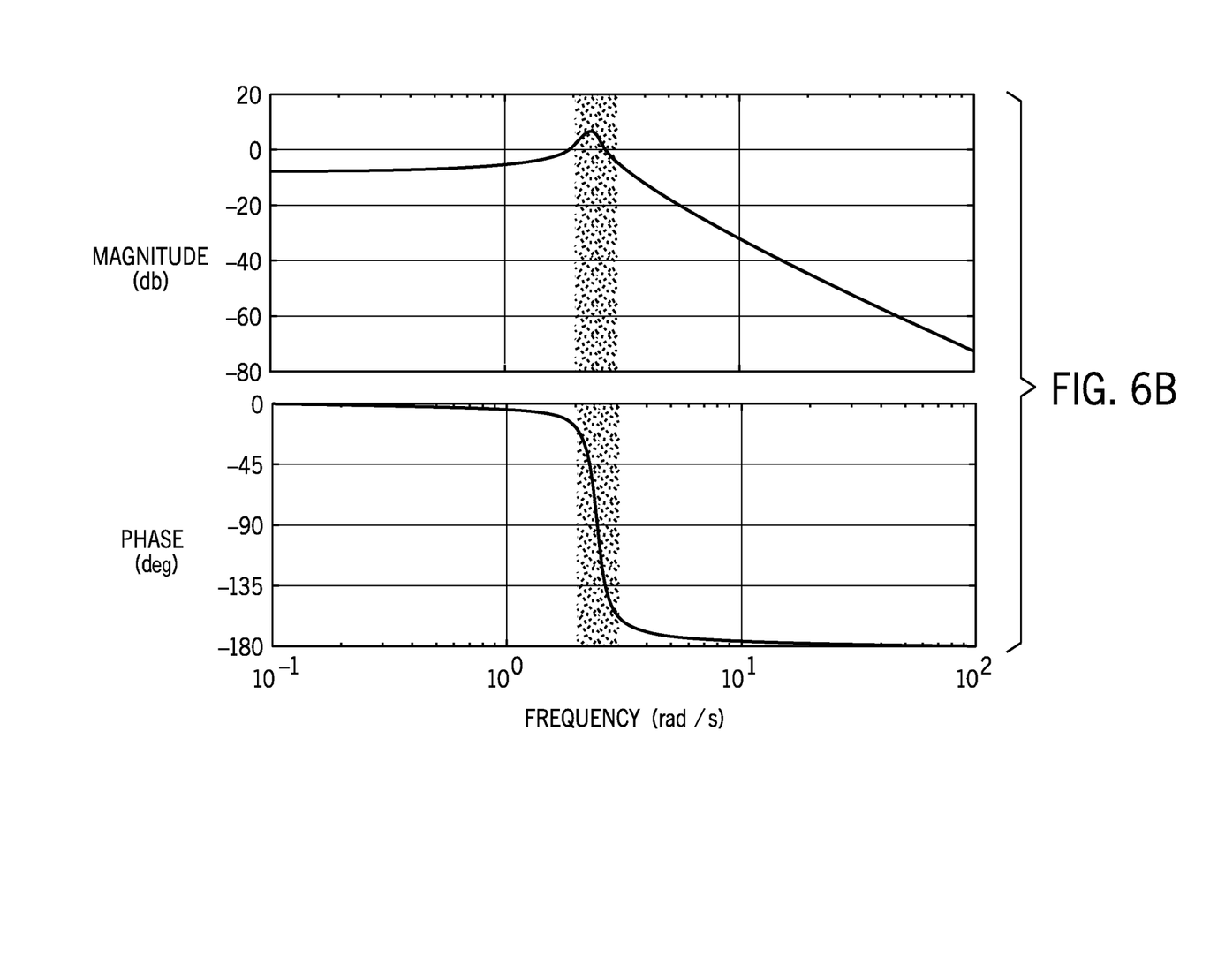

FIGS. 6A and 6B provide one example of vessel attitude data recorded over time and transformed to the frequency domain. FIG. 6A depicts a roll response to input disturbances, where the roll response data was acquired over a period of time and transferred to the frequency domain. A transfer function can then be estimated describing a best fit, such as via a least squares regression line determination or other curve fitting function. Assuming that sufficient data is acquired, the dominant roll frequency, or the frequency with the most power represented in the plot, will be the natural roll frequency of the marine vessel. This is represented at FIG. 6B, where the natural roll frequency is highlighted, representing the frequency or frequency range where the transfer function has the largest magnitude. The natural pitch frequency for the marine vessel can be determined similarly by examining pitch measurements acquired over time and located the dominant pitch frequency in the data.

The system is configured to exploit the natural roll and/or pitch frequencies of the marine vessel by determining a counteracting drive movement that will induce an opposing roll in the marine vessel in order to counteract unwanted roll due to external forces. Namely, by adjusting the angles of one or more of the propulsion devices 12a and 12b utilizing the steering actuators 21a and 21b, the counteracting drive movement is induced. In various embodiments, the propulsion devices 12a and 12b may be moved together, only one of the propulsion devices 12a or 12b may be moved, or various patterned combinations thereof. Where both propulsion devices 12a and 12b are moved, they may be moved in parallel or may be moved oppositely (i.e. splayed). Likewise, the propulsion devices 12a and 12b may be moved to steering angles of the same magnitude as one another, or to different magnitudes depending on the configuration of the propulsion system (such as the number of propulsion devices and their placement on the marine vessel 10).

Figure 5:
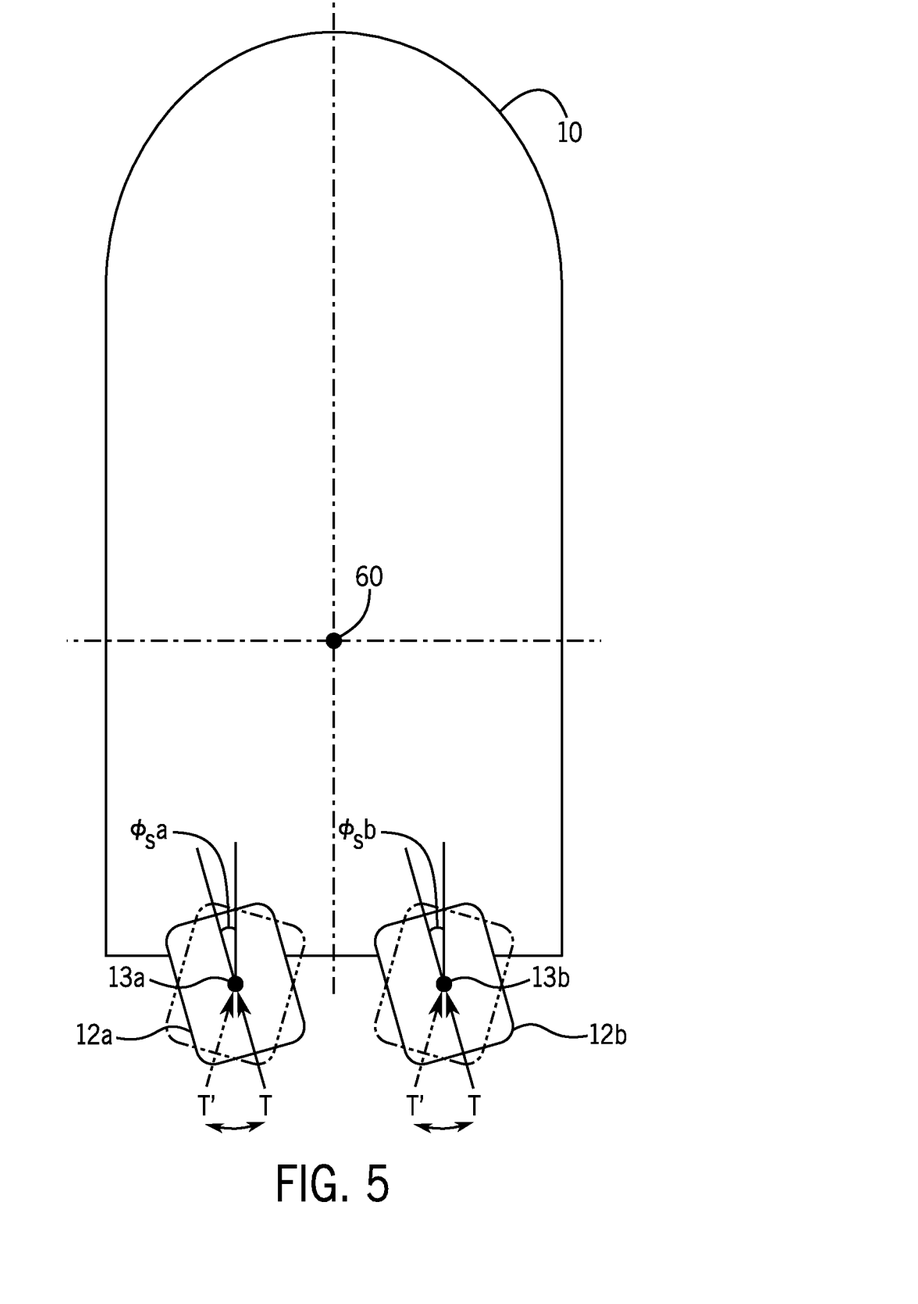
FIG. 5 schematically illustrates exemplary propulsion device control to counteract an environmentally-induced roll movement of the marine vessel.

FIG. 5 provides an illustrative diagram exemplifying a contracting drive movement that may be utilized to induce a counteracting roll motion, or counteracting forces that oppose an unwanted roll motion of the marine vessel. In the example, each propulsion device 12a and 12b is rotated about its steering axis 13a and 13b between a first position and a second position ($\phi_s$ and $-\phi_s$) at a predetermined frequency. The counteracting drive movement, including the positions of the marine vessel and the rate at which the drives are moved, are calculated based on the measured roll motion by the attitude sensor 36 and the natural frequency of the marine vessel. Depending on the magnitude of the unwanted roll that needs to be counteracted and the dynamics of the marine vessel, the counteracting drive movement may be sufficient to counteract, and thus eliminate, the unwanted vessel roll. Propulsion devices are often quite large and heavy and, particularly for outboard propulsion devices, movement of the large devices back and forth in a way that targets the vessel's natural roll frequency can be effective at counteracting unwanted roll forces.

In certain embodiments, one or more of the propulsion devices 12a, 12b may also be controlled in order to selectively produce a thrust T. For example, the engines of the propulsion devices may be controlled in order to produce a pulsed thrust T, which may be utilized to induce a roll motion or to induce a pitch motion, or both. Thus, the system 20 may also be configured to control the engines 14a and 14b to generate a thrust T to assist in inducing roll motion. For example, the propulsion devices 12a, 12b may be controlled to momentarily generate a thrust T when the predefined steering position data $-\phi_s a$, $-\phi_s b$ is reached. That same thrust magnitude may then be repeated once the propulsion devices are rotated to an opposite steering angle to generate the thrust T'. The thrust vectors T and T' are calculated such that effectuating the pulsed thrusts at the alternating angles will not induce a net change in translation or yaw of the marine vessel—i.e., outside of any translation or yaw commanded by the user or by controller-executed navigation. Thus, where thrust is commanded, it may be calculated so as not to induce any change on the current thrust vector commanded for the marine vessel prior to effectuating the counteracting drive movement and counteracting thrust. The thrust vectors T of the propulsion devices 12a, 12b may be identical to one another, or may have different magnitudes, but the total thrust, such as over one period of rotation or possibly over several rotations, does not effectuate a net change to the commanded thrust generated for vessel steering and navigation. Thus, the counteracting drive movement and counteracting thrust are calculated to induce counteracting roll and/or counteracting pitch motion in the marine vessel without causing translation of the marine vessel 10 or any change in the net thrust vector exerted on the marine vessel.

Figure 7:
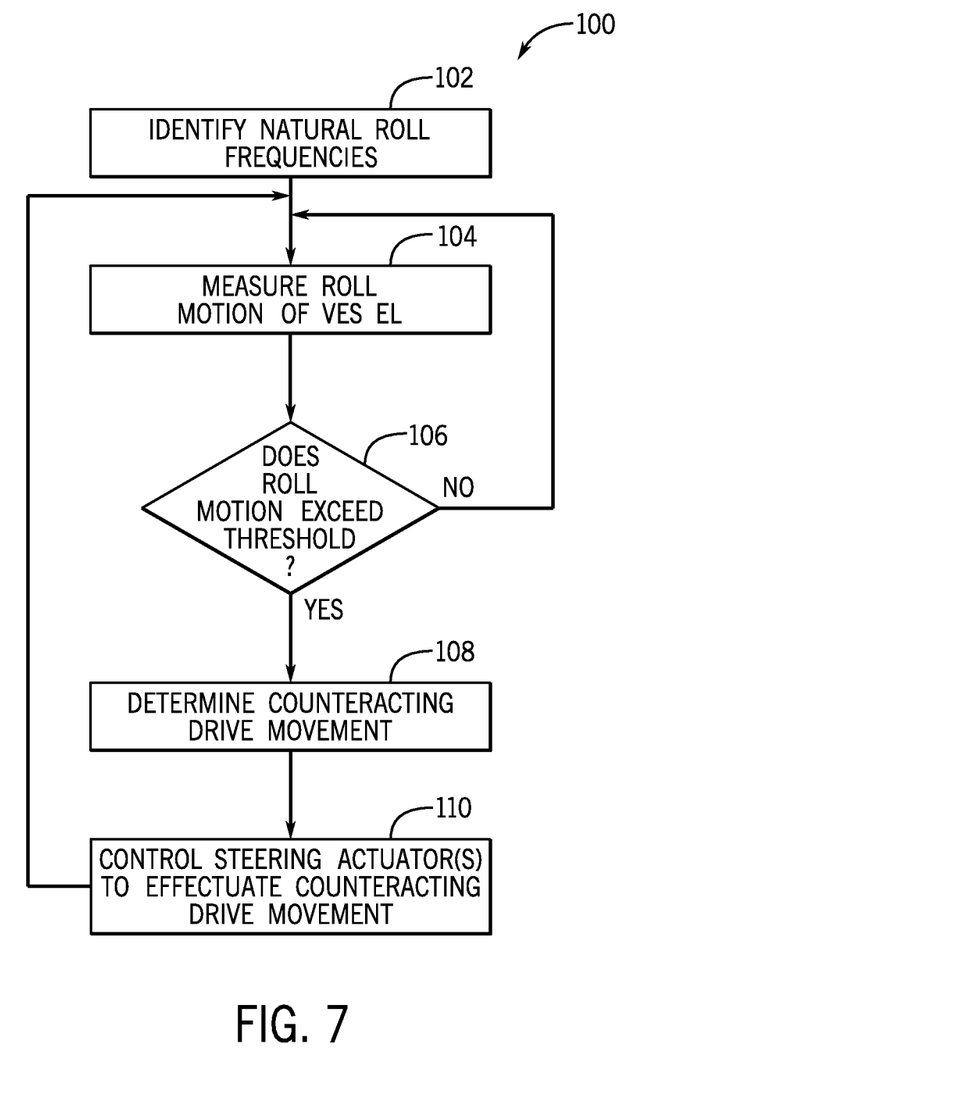
FIGS. 7-9 are flow charts depicting exemplary methods, or portions thereof, of controlling propulsion of a marine vessel in order to control attitude of the marine vessel, including roll and pitch.
Figure 8:
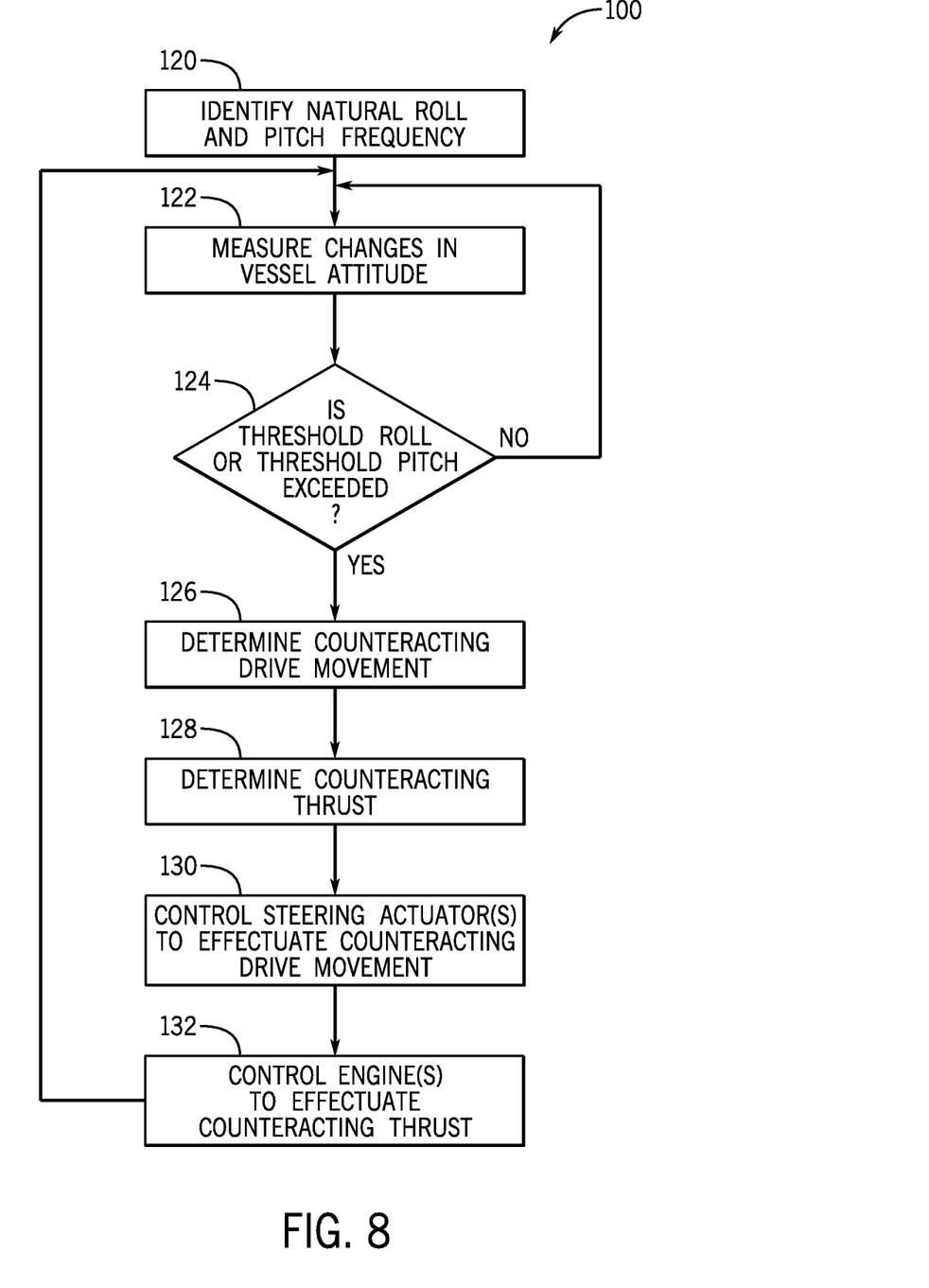
Figure 9:
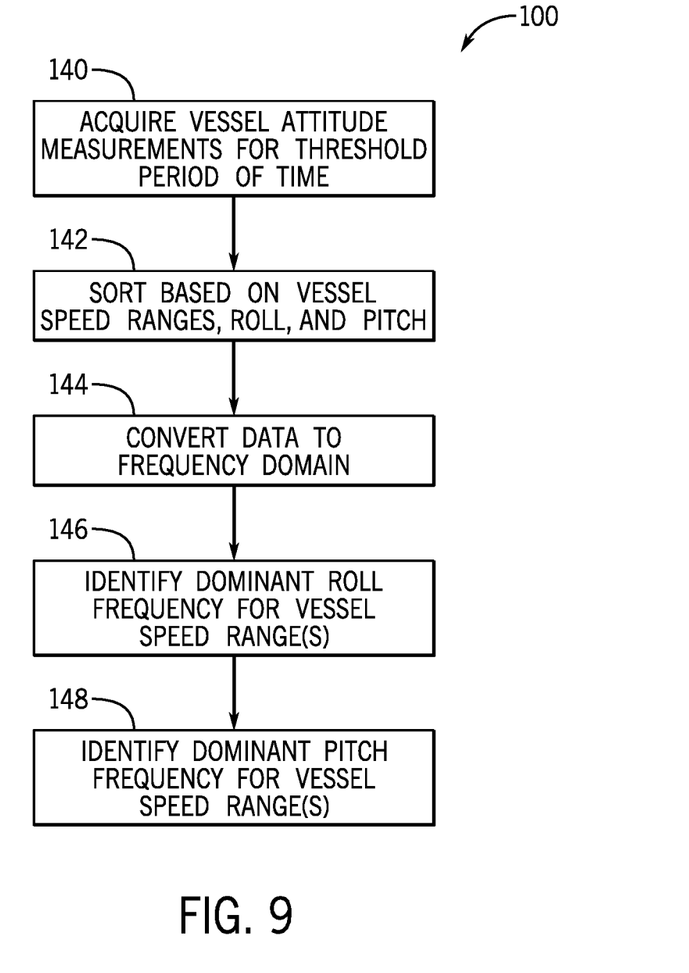

FIGS. 7 and 8 are flow charts depicting exemplary methods, or portions thereof, for controlling attitude of a marine vessel. In the embodiment at FIG. 7, the method 100 of controlling attitude includes identifying a natural roll frequency of the marine vessel at step 102. For example, the natural roll frequency may be stored in memory accessible to the processing system of the controller 24 as part of a vessel model stored in memory of the controller 24. For example, the controller 24 may store and utilize a vessel dynamics model, which is a computational model embodied in software and utilized, for example by the steering controller, to approximate the vessel dynamics for a particular marine vessel based on known or measured conditions. Such a vessel dynamics model may be created and/or stored within the controller 24 and approximate the vessel dynamics for the marine vessel 10 based on the characteristics thereof, such as length, beam, and weight. The vessel dynamics model can be used to solve for a surge, sway, roll and/or yaw commands for controlling propulsion of the marine vessel to achieve a desired inertial velocity for the particular marine vessel. Such natural frequency information about the marine vessel may be computationally estimated based on vessel hull parameters and weight, for example, or may derived or calibrated for a particular marine vessel based on attitude measurements acquired during operation of the vessel. FIG. 9 depicts one embodiment of steps for determining a natural roll frequency and a natural pitch frequency for a marine vessel based on attitude measurements.

Roll motion of the marine vessel is then measured at step 104, such as via the IMU or other type of attitude sensor 36. If the roll motion exceeds a threshold at step 106, where no corresponding steering input is detected, then a counteracting drive movement is determined at step 108. Namely, if the change in roll corresponds to a vessel turn or significant change in throttle command, then the roll motion can be determined benign, or not externally induced, and the threshold may not be triggered. If the measured roll does not exceed the threshold, then the controller returns to step 104 and continues to measure and monitor the roll motion of the vessel 10. For example, the threshold roll may be a minimum roll angle and/or a minimum roll rate that does not correlate to a steering input and will excite the natural roll frequency of the marine vessel.

Once the threshold is exceeded, then the counteracting drive movement is determined at step 108 based on the roll motion measured at step 104 and the natural roll frequency of the marine vessel. As described above, the counteracting drive movement may include a drive angle $\phi_s$, a frequency of rotation, and/or a timing and magnitude of thrust T for one or more of the propulsion devices 12a, 12b. The steering actuators 21a, 21b are then controlled, such as by cooperation between the controller 24 and one or more controllers for the actuators 21a, 21b, to effectuate the counteracting drive movement and thus to counteract the unwanted roll motion of the marine vessel.

FIG. 8 depicts another embodiment of a method 100 of controlling attitude of a marine vessel, where both roll and pitch are controlled using counteracting drive movement and counteracting thrust. The natural roll and pitch frequencies for the marine vessel are identified at step 120. Changes in attitude of the marine vessel 10 are measured by the attitude sensor 36 and provided to the controller, represented at step 122. For example, the changes in vessel attitude may be a roll rate or pitch rate. Alternatively or additionally, the attitude measurements may include a roll magnitude and/or roll angle and pitch magnitude and/or pitch angle. The controller 24 then determines at step 124 whether the measured attitude exceeds a threshold roll or threshold pitch. If either the threshold roll or threshold pitch, or both, are exceeded, then a counteracting drive movement is determined at step 126 based on the measured roll motion and measure pitch motion and the natural roll frequency and natural pitch frequency for the marine vessel. Depending on the measured roll and pitch values, a counteracting thrust may be determined at step 128. For example, if the pitch threshold is exceeded, then the counteracting thrust will be calculated accordingly. Similarly, if the measured roll magnitude or roll rate is sufficiently large such that drive movement, alone, will be insufficient to eliminate the unwanted roll motion in a timely way, then counteracting thrust may be calculated at step 128 to assist in counteracting the unwanted roll motion. The steering actuators are then controlled at step 130 to effectuate the counteracting drive movement and the engines of the one or more propulsion devices are controlled at step 132 to effectuate the counteracting thrust.

FIG. 9 depicts one embodiment of steps for identifying a natural roll frequency of the marine vessel. Attitude measurements are acquired at step 140 over a period of time, which may be a threshold period of time sufficient for identifying a natural frequency for the marine vessel. In certain embodiments, the attitude measurements may be sorted based on vessel speed at the time of acquisition. As represented at step 142, the vessel attitude may be sorted based on vessel speed ranges. For example, attitude measurements acquired when the marine vessel is stationary and/or at very low vessel speeds may be grouped together, vessel attitude measurements acquired at medium vessel speeds where the marine vessel is not on plane may be provided in another group, and vessel attitude measurements acquired while the marine vessel is at high speeds and on plane may be sorted into yet another group. As will be understood by a person having ordinary skill in the art reviewing this disclosure, the vessel attitude data may be sorted into other vessel speed ranges based on variations in vessel behavior at different vessel speeds.

The vessel attitude measurements may further be sorted to isolate roll measurements and pitch measurements so that each motion direction may be analyzed separately to determine dominant roll frequency and dominant pitch frequency behavior for the marine vessel. Each data set is then converted to the frequency domain at step 144, such as via application of the Fast Fourier transform (FFT). By analyzing each data set in the frequency domain, dominant frequencies for the marine vessel can be identified at step 146. For example, dominant roll frequencies at each of the vessel speed ranges can be identified, such as the dominant roll frequency while the marine vessel at idle and low speeds compared to the dominant roll frequency while the marine vessel is on plane. As illustrated and discussed above, FIGS. 6A and 6B provide one example of roll measurements for a marine vessel acquired over time shown in the frequency domain and demonstrating a dominant frequency. Dominant pitch frequencies for the marine vessel may likewise be identified at step 148 based on the pitch data for each vessel speed range converted to the frequency domain. The dominant roll and pitch frequencies can then be stored so as to be accessible by the controller 24 for identifying the natural roll and pitch frequencies for the control purposes described herein. In certain examples, the natural roll and pitch frequencies may be identified based on a current vessel speed measured by a vessel speed sensor, such as a GPS or other vessel speed sensor (e.g. paddle wheel or pitot tube), examples of which are well known in the art. In such an embodiment, the natural roll and pitch frequencies for the appropriate vessel speed range is selected by the controller 24.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling attitude of a marine vessel, the method comprising:
measuring a roll motion of the marine vessel with an attitude sensor;
determining that the roll motion exceeds a threshold roll, where no corresponding steering input is present;
determining a counteracting drive movement for at least one propulsion device based on the measured roll motion; and
controlling a steering actuator to move the at least one propulsion device to effectuate the counteracting drive movement so as to counteract the roll motion of the marine vessel without effectuating a net heading change of the marine vessel and/or without effectuating a net change in a current thrust vector of the marine vessel.

2. The method of claim 1, wherein the counteracting drive movement for the at least one propulsion device is determined further based on a current vessel speed of the marine vessel.

3. The method of claim 1, wherein the counteracting drive movement is determined based further on the current thrust vector of the marine vessel, wherein the counteracting drive movement is determined so as to not induce the net change in the current thrust vector of the marine vessel.

4. The method of claim 1, wherein the at least one propulsion device includes an outboard motor, and further comprising generating no output thrust from the outboard motor so as to counteract the roll motion of the marine vessel by only the counteracting drive movement of the outboard motor.

5. The method of claim 1, wherein the counteracting drive movement includes at least one of a drive angle and a frequency of rotation of the propulsion device.

6. The method of claim 1, wherein the threshold roll includes at least one of a minimum roll angle and a minimum roll rate that will excite a natural roll frequency of the marine vessel.

7. The method of claim 1, further comprising identifying a natural roll frequency of the marine vessel and storing the natural roll frequency in memory.

8. The method of claim 7, further comprising identifying a dominant frequency at each of at least two vessel speeds to identify the natural roll frequency at each of the at least two vessel speeds, and wherein identifying the natural roll frequency includes selecting one of the natural roll frequencies based on a current vessel speed.

9. The method of claim 1, further comprising determining a counteracting thrust for the at least one propulsion device based on the measured roll motion and the counteracting drive movement; and
controlling an engine of the at least one propulsion device to effectuate the counteracting thrust to counteract the roll motion of the marine vessel.

10. The method of claim 1, further comprising:
measuring a pitch motion of the marine vessel with the attitude sensor;
determining that the pitch motion exceeds a threshold pitch;
determining a counteracting thrust based on the measured pitch motion; and
controlling an engine of the at least one propulsion device to effectuate the counteracting thrust to thereby counteract the pitch motion of the marine vessel.

11. The method of claim 10, wherein the threshold pitch is a pitch change that will excite a natural pitch frequency of the marine vessel and/or wherein the counteracting thrust is determined based further on the natural pitch frequency of the marine vessel.

12. A system for controlling attitude of a marine vessel, the system comprising:
a plurality of propulsion devices connected to a transom of the marine vessel;
for each of the plurality of propulsion devices, a steering actuator configured to rotate that propulsion device about a vertical axis;
a vessel attitude sensor configured to measure at least a roll motion of the marine vessel;
a control system configured to:
receive a roll motion measurement of the marine vessel from the attitude sensor;
determine that the roll motion measurement exceeds a threshold roll where no corresponding steering input is present;
determine a counteracting drive movement for at least one of the plurality of propulsion devices based on the roll motion measurement; and
control the steering actuator for the at least one of the plurality of propulsion devices to effectuate the counteracting drive movement so as to counteract the roll motion of the marine vessel.

13. The system of claim 12, wherein the counteracting drive movement is effectuated without effectuating a net heading change of the marine vessel and/or without effectuating a net change in a current thrust vector of the marine vessel.

14. The system of claim 12, wherein the threshold roll includes at least one of a minimum roll angle and a minimum roll rate that will excite a natural roll frequency of the marine vessel.

15. The system of claim 12, wherein the plurality of propulsion devices includes at least two outboard motors and wherein the system is further configured such that the counteracting drive movement includes moving at least one of the outboard motors at a time.

16. The system of claim 15, wherein the counteracting drive movement includes moving only one of the outboard motors at a time.

17. The system of claim 15, wherein the counteracting drive movement includes at least one of a drive angle and a frequency of rotation of the at least one of the outboard motors.

18. The system of claim 12, wherein the counteracting drive movement is determined so as to avoid a net change in a translation of the marine vessel.

19. The system of claim 12, wherein the control system is further configured to:
determine a counteracting thrust for the at least one of the plurality of propulsion devices based on the measured roll motion and the counteracting drive movement; and
control an engine of the at least one of the plurality of propulsion devices to effectuate the counteracting thrust to counteract the roll motion of the marine vessel.

20. The system of claim 19, wherein the counteracting drive movement and the counteracting thrust are determined based further on a current thrust vector of the marine vessel so as to avoid a net change to the current thrust vector.

21. The system of claim 12, wherein the control system is further configured to:
receive a pitch motion measurement of the marine vessel from the attitude sensor;
determine that the measured pitch motion exceeds a threshold pitch;
determining a counteracting thrust based on the measured pitch motion; and
controlling an engine of the at least one of the plurality of propulsion devices to effectuate the counteracting thrust to thereby counteract the measured pitch motion of the marine vessel.

22. The system of claim 21, wherein the threshold pitch is a pitch change that will excite a natural pitch frequency of the marine vessel and/or wherein the counteracting thrust is determined based further on the natural pitch frequency of the marine vessel.

* * * * *